(12) United States Patent
Oliveira (10) Patent No.: US 9,944,117 B2
(45) Date of Patent: Apr. 17, 2018

(54) ELLIPTICAL SHAPED WHEEL WITH LEVELED AXIS

(71) Applicant: AUTOFORESE, PROTECÇÃO ANTICORROSIVA, LDA, Ponte de Sor (PT)

(72) Inventor: Jacinto José Lopes Oliveira, Monte Gordo (PT)

(73) Assignee: AUTOFORESE, PROTECÇÃO ANTICORROSIVA, LDA, Ponte de Sor (PT)

( * ) Notice: Subject to any disclaimer, the term of this patent is extended or adjusted under 35 U.S.C. 154(b) by 0 days.

(21) Appl. No.: 15/109,998

(22) PCT Filed: Jan. 6, 2015

(86) PCT No.: PCT/PT2015/000001
§ 371 (c)(1),
(2) Date: Jul. 6, 2016

(87) PCT Pub. No.: WO2015/102505
PCT Pub. Date: Jul. 9, 2015

(65) Prior Publication Data
US 2016/0325584 A1 Nov. 10, 2016

(30) Foreign Application Priority Data
Jan. 6, 2014 (PT) .......................................... 107388

(51) Int. Cl.
*B60B 19/00* (2006.01)
*B60B 27/02* (2006.01)
(Continued)

(52) U.S. Cl.
CPC ............ *B60B 19/00* (2013.01); *B60B 27/023* (2013.01); *B60B 27/04* (2013.01); *B62M 11/02* (2013.01)

(58) Field of Classification Search
CPC ....... B60B 19/00; B60B 27/023; B60B 27/04; B62D 57/022
See application file for complete search history.

(56) References Cited

U.S. PATENT DOCUMENTS

| 271,122 A | 1/1883 | Riley et al. |
| 2,256,570 A | 9/1941 | Kopczynski |
| (Continued) | | |

FOREIGN PATENT DOCUMENTS

| CN | 2561677 | 7/2003 |
| CN | 2774909 | 4/2006 |
| (Continued) | | |

OTHER PUBLICATIONS

International Search Report for PCT/PT2015/000001, dated Apr. 17, 2015.
(Continued)

*Primary Examiner* — Kip T Kotter
(74) *Attorney, Agent, or Firm* — B. Aaron Schulman, Esq.; Stites & Harbison, PLLC (57) ABSTRACT

A rotating elliptical shaped wheel in which the height of the frame axis to the ground does not vary during each rotation cycle, thereby maintaining a constant height linear movement; comprising a crankshaft or eccentric where the length of the crankshaft arm or the distance between the two centers of the diameters of the eccentric shaft, are equal to ¼ of the difference between the largest and smallest diameter of the ellipse; a crown gear fixed to the elliptical shaped wheel; a reel fixed to the structure, a circular drum, whose axis coincides with the axis of the elliptical shaped wheel and co-rotational with the elliptical shaped wheel and the crown gear and a reel coupled to the eccentric or crankshaft.

8 Claims, 10 Drawing Sheets

(51) Int. Cl.
  *B60B 27/04*   (2006.01)
  *B62M 11/02*   (2006.01)

(56) References Cited

U.S. PATENT DOCUMENTS

| | | | | |
|---|---|---|---|---|
| 2,786,540 | A | * | 3/1957 | Sfredda ................ B62D 57/022 180/24.08 |
| 2,790,503 | A | * | 4/1957 | Kopczynski ......... B62D 57/022 180/363 |
| 2,819,767 | A | | 1/1958 | Kopczynski |
| 3,152,813 | A | | 10/1964 | Brown |
| 3,160,220 | A | * | 12/1964 | Goulden ................ B62D 49/00 180/22 |
| 3,459,454 | A | | 8/1969 | Liston |
| 3,782,751 | A | * | 1/1974 | Williams ................ B60B 19/00 280/220 |
| 4,817,747 | A | * | 4/1989 | Kopczynski ............ B60B 19/00 180/22 |
| 7,749,033 | B1 | * | 7/2010 | Paulus .................... B60B 11/02 180/7.1 |
| 8,002,294 | B2 | * | 8/2011 | Brandeau ................ B60B 19/00 280/80.1 |
| 2004/0051373 | A1 | * | 3/2004 | Tolkachev ................ B60B 9/26 301/55 |
| 2005/0096190 | A1 | * | 5/2005 | Kuo ........................ B62K 17/00 482/57 |
| 2011/0140383 | A1 | | 6/2011 | Brandeau |

FOREIGN PATENT DOCUMENTS

| | | | |
|---|---|---|---|
| CN | 201002674 | | 1/2008 |
| GB | 945375 A | * | 12/1963 ............. B62D 49/00 |
| RU | 2207249 | | 6/2003 |

OTHER PUBLICATIONS

Written Opinion for the International Search Authority for PCT/PT2015/000001, dated Apr. 17, 2015.

* cited by examiner

ELLIPTICAL SHAPED WHEEL WITH LEVELED AXIS

OBJECT OF THE INVENTION

The present invention relates to a rotating elliptical shaped wheel in which the height of the frame axis to the ground does not vary during each rotation cycle, thereby maintaining a constant height linear movement.

STATE OF THE ART

Some documents describing inventions on which elliptical wheels are presented, are already known from the state of the art.

U.S. Pat. No. 3,152,813 describes a vehicle with elliptic wheels, said wheels having the axis of rotation exactly in the center of the ellipse. The purpose of the invention presented in this document is to simulate the movement of other vehicles or objects, which have no resemblance regarding the object of the present invention.

U.S. Pat. No. 3,459,454 also describes an elliptical wheel. However, this wheel has an operation similar to a caterpillar, maintaining its larger diameter parallel to the ground through a flexible outer structure composed of several elements.

The patent RU2207249 describes an elliptical wheel with the ability to transform itself in a conventional wheel through a flexible ring/rim. In the wheel described in this document the ability to maintain the axis of the structure at a constant height is not verified.

BRIEF DESCRIPTION OF THE INVENTION

The present invention refers to a rotating elliptical shaped wheel in which the height of the frame axis to the ground does not vary during each rotation cycle, thereby maintaining a constant height linear movement.

The elliptical wheel of the present invention can be applied to bicycles, tricycles and quadricycles, scooters or other human traction vehicles without the need of a linear and continuous effort by its user since, at each revolution, half of the cycle presents a larger progressive effort while the other half presents a progressively smaller effort, thus allowing muscle relaxation. The present invention may also be used in motor vehicles such as agricultural vehicles and military vehicles providing a significant increase in their traction power due to the wheel profile not being circular, reducing the slip effect when compared to conventional wheels.

The present invention offers several advantages which are highlighted as follows:

By using a rotating elliptic wheel, keeping the distance from its axis to the ground, a different aesthetic effect from the conventional wheel is created.

The vehicle traction power is also improved, thereby reducing the effect of "skating", which is common in conventional wheels.

Unlike other existing elliptical wheels on vehicles, the user of a vehicle with the elliptical form wheel of the present invention does not notice any distance change to the ground, being his experience compared to the one obtained with a conventional wheel.

Regarding the use of the elliptical wheel of the present invention in human traction vehicles, this one allows a higher muscle relaxation when compared to a conventional wheel since it is only necessary to perform effort alternately.

The above mentioned figures, in which the elements of the present invention are found, are represented to provide a better understanding of the present invention. Their representation and description are to be considered illustrative and not limitative of the scope of the present invention.

In the detailed description of the invention, which is presented below, references will be made to the above mentioned figures in order to facilitate the understanding of the invention.

DETAILED DESCRIPTION OF THE INVENTION

The present invention relates to a rotating elliptical shaped wheel in which the height of the frame axis to the ground does not vary during each rotation cycle, thereby maintaining a constant height linear movement.

Figure 10:
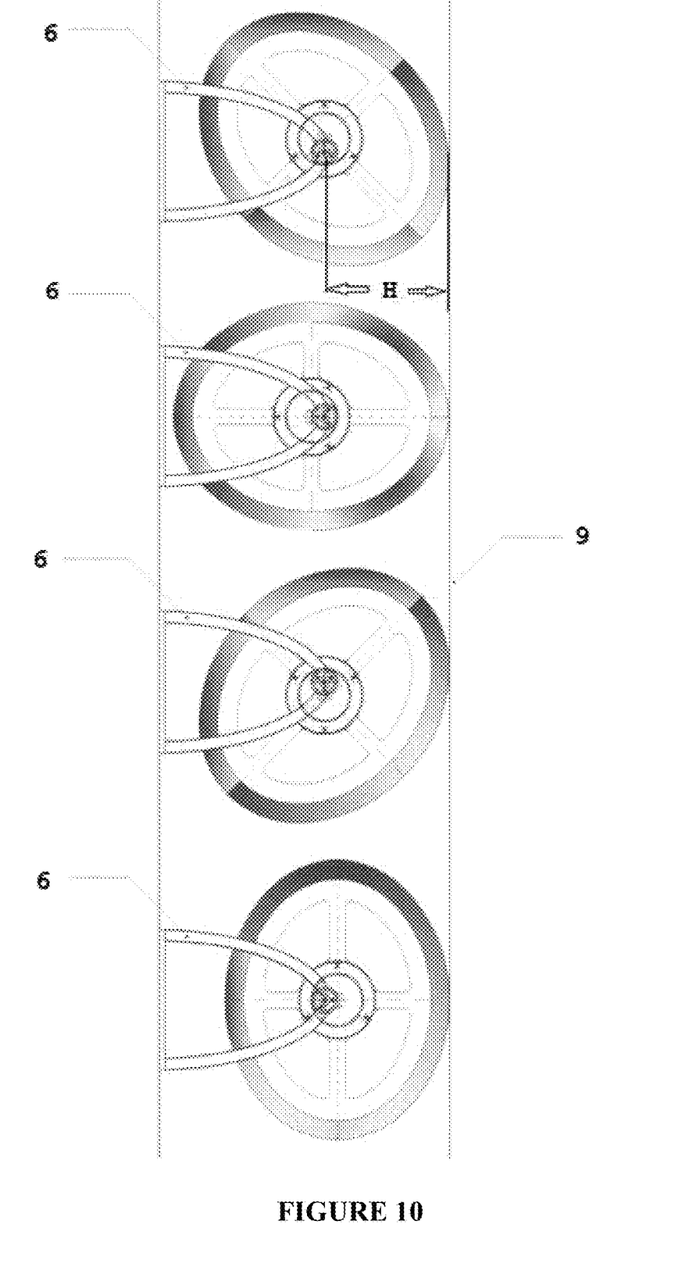
FIG. 10 is a schematic representation of the operation of the elliptic wheel of the present invention, where one can observe the constant distance "H", from the frame (6) relative to ground (9), during the several stages of contact with the ground.

In order to provide a better understanding of the present specification, the following nomenclature will be used:

"H"—Distance of the structure (6) to the ground
"D"—Larger diameter of the elliptical wheel
"d"—Smaller diameter of the elliptical wheel
"R"—compensatory Radius This invention is based on the use of a crankshaft (1) or eccentric (8) shaft that opposes the movement caused by the wheel axis when said wheel has its larger diameter in contact with the ground, in order to offset the difference in height while maintaining the structure (6) at a constant distance "H" of the ground, as shown in FIG. 10.

In the center of the elliptical shaped wheel a circle of radius "R" is created, wherein the radius obeys to the following ratio:

$$"R" = \frac{"D" - "d"}{4}$$

Said circle with a radius "R" thus allows the transmission of the rotational movement.

The compensation of the difference between "D" and "d" is obtained with the use of a crankshaft (1), or eccentric (8), associated with a crown gear (2), and an inner reel (3), whose diameters are respectively 4"R" and 2"R".

The main compensatory mechanism of this invention consists of five main elements. Following, the referred elements are presented using the reference numbers shown in the figures.

Figure 1:
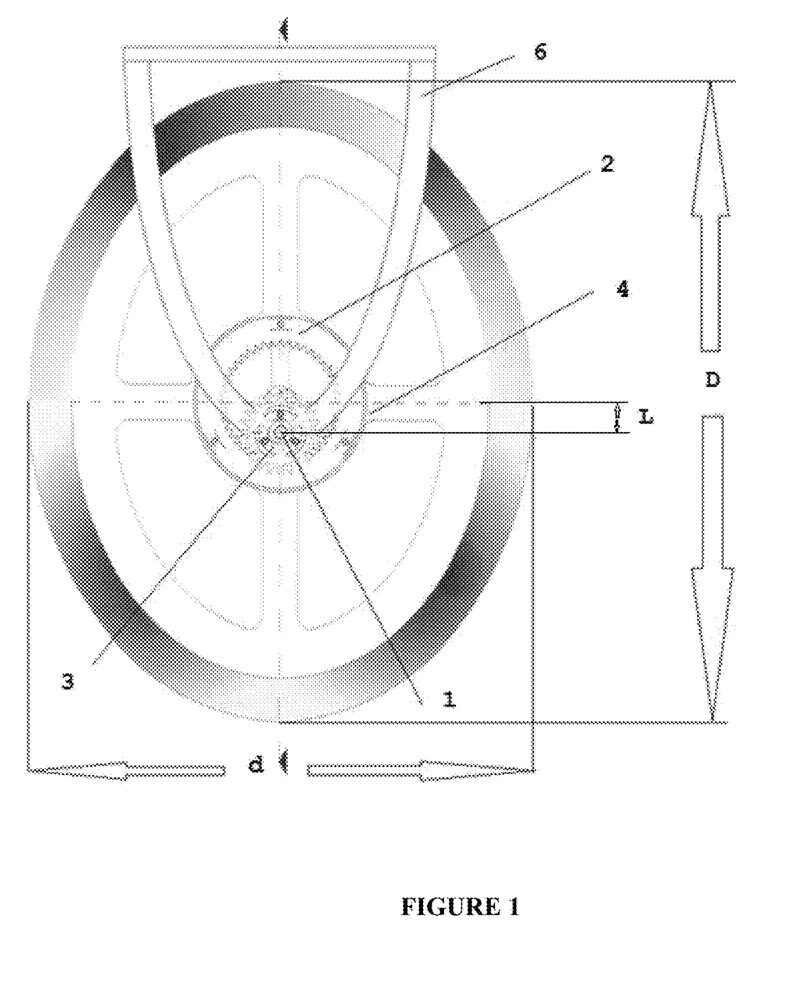
FIG. 1 is a schematic representation of an embodiment of the present invention in which one can observe the elliptical shaped wheel of the present invention with a crankshaft supported only on one side of the structure.
Figure 2:
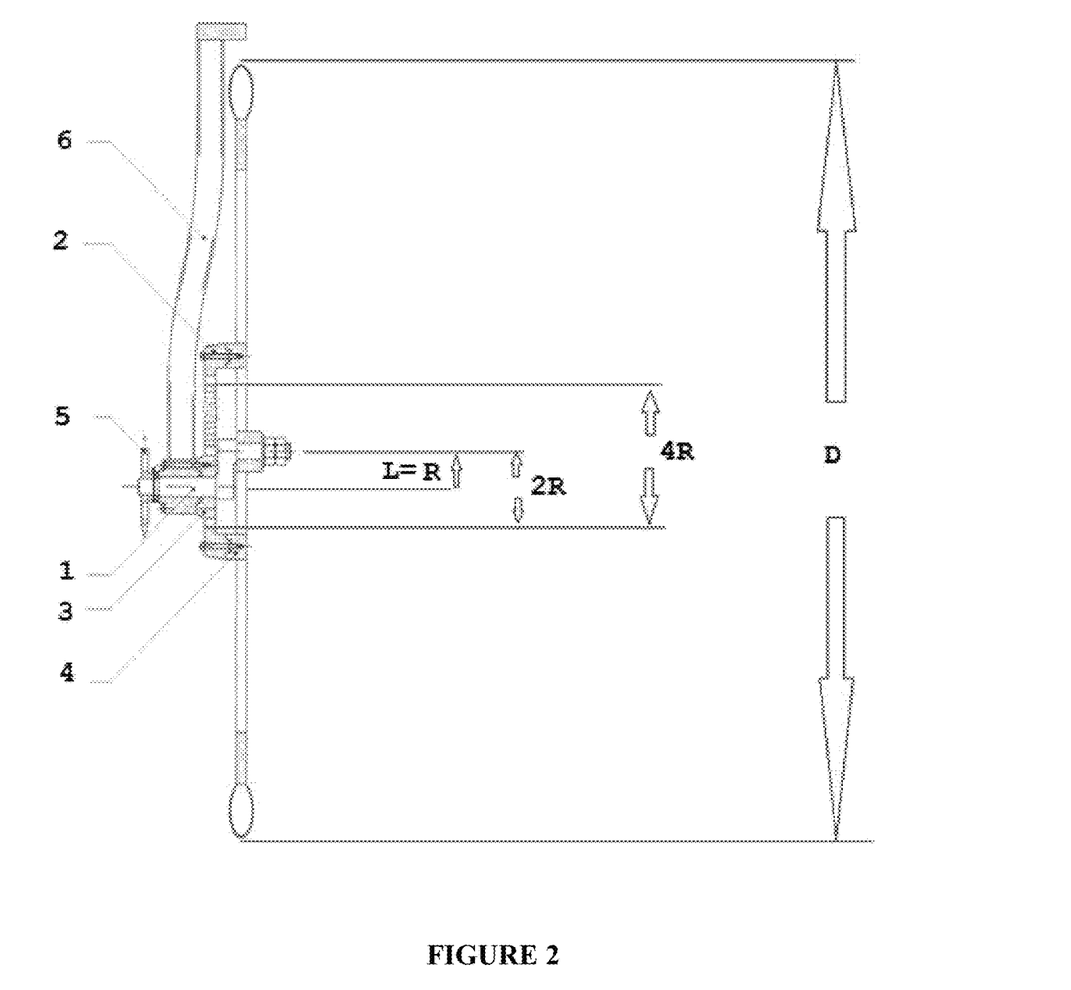
FIG. 2 is a schematic cross section representation of an embodiment of the present invention (crankshaft supported only on one side of the structure) by the section represented in FIG. 1.
Figure 3:
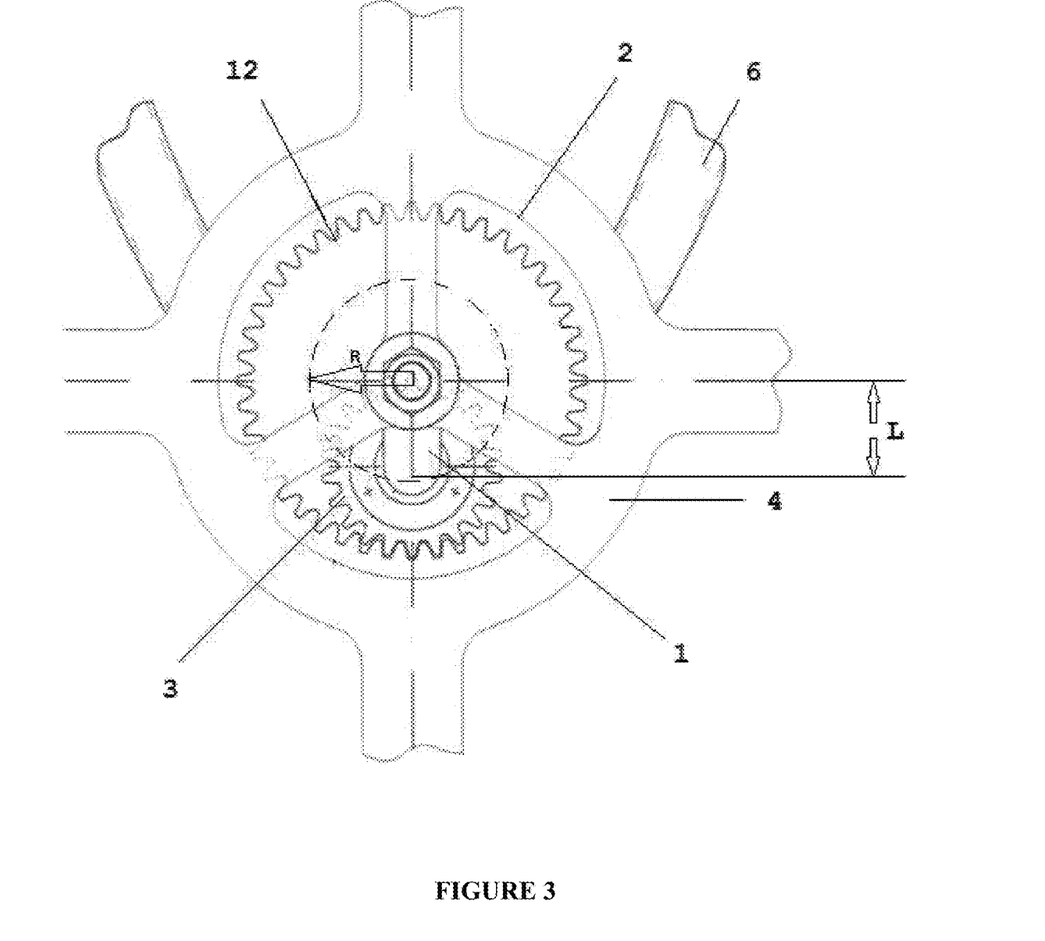
FIG. 3 is a schematic cross section representation of an embodiment of the present invention (crankshaft supported only on one side of the structure) by a detail of the lateral view in FIG. 2.
Figure 4:
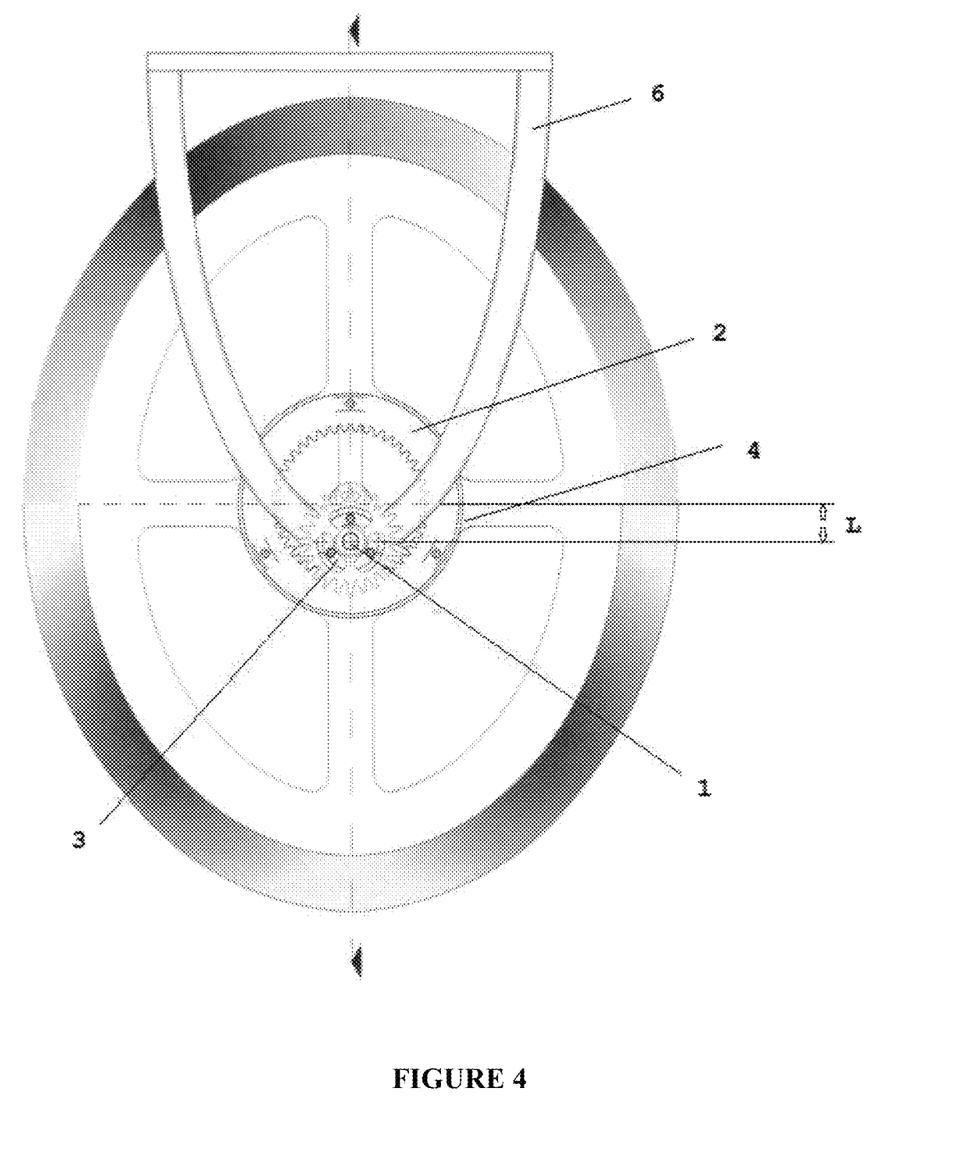
FIG. 4 is a schematic representation of an alternative embodiment of the present invention in which, one can observe the elliptical shaped wheel of the present invention with a crankshaft with two support points.
Figure 5:
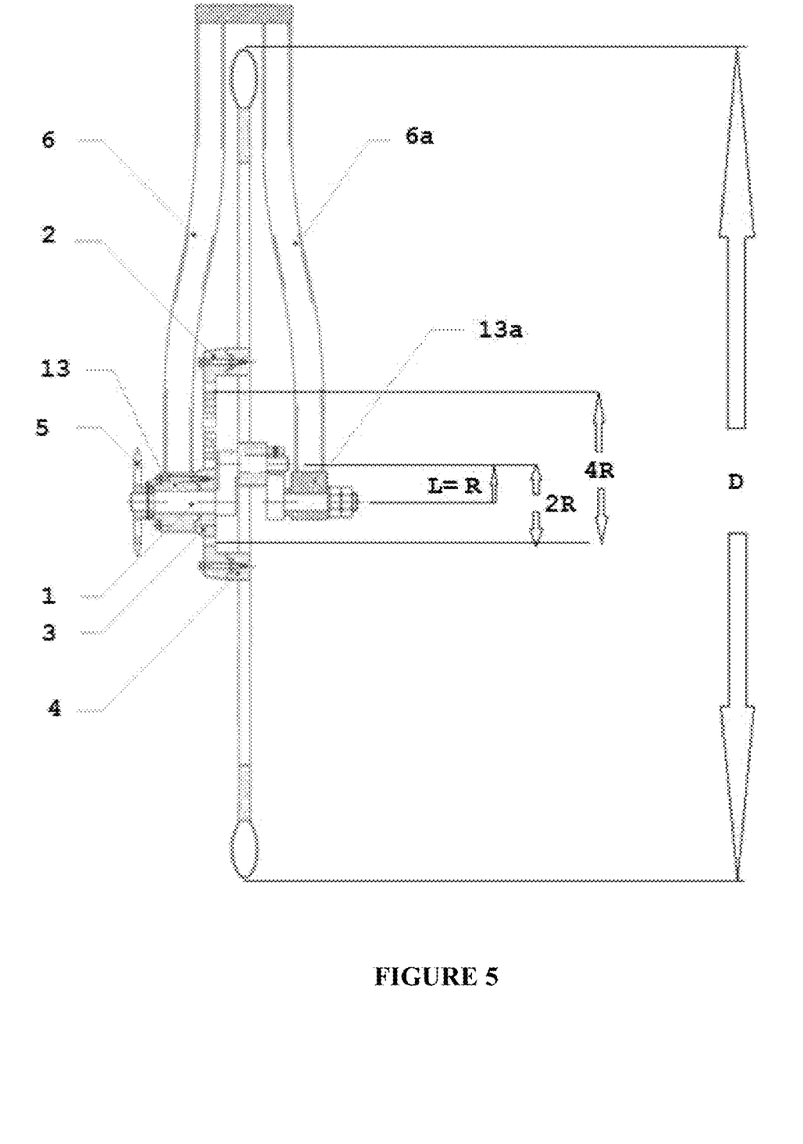
FIG. 5 is a schematic cross section representation of an embodiment of the present invention (crankshaft with two support points) by the section represented in FIG. 4.
Figure 6:
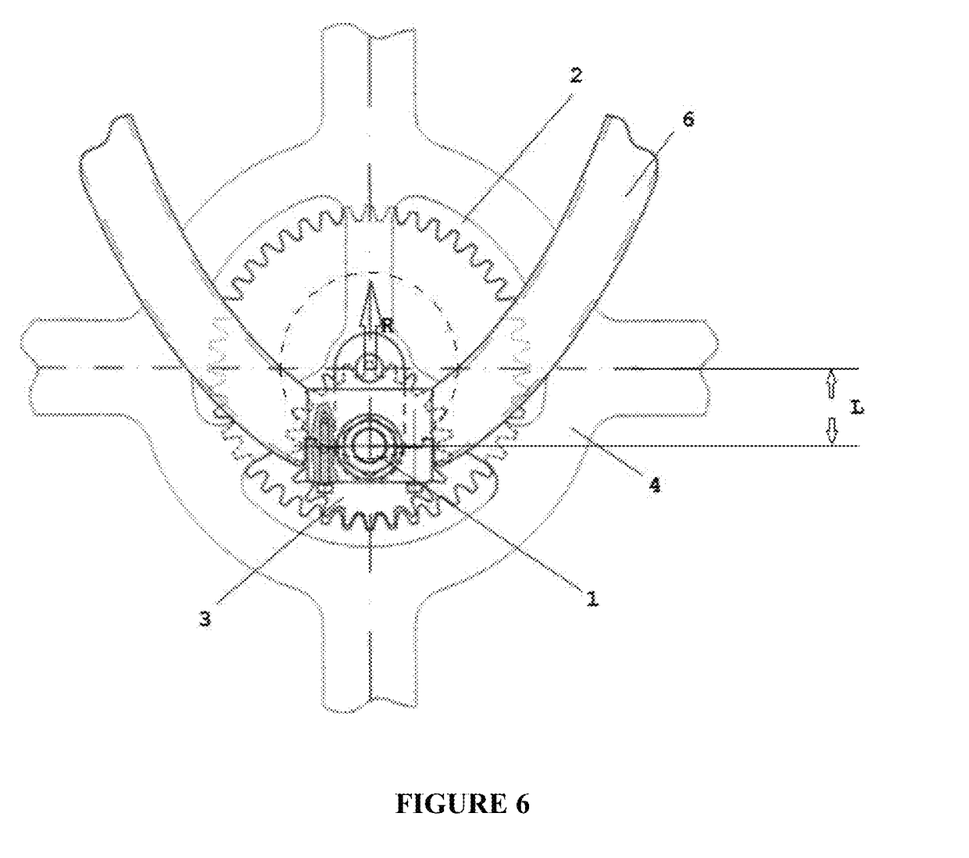
FIG. 6 is a schematic cross section representation of an embodiment of the present invention (crankshaft with two support points) by a detail of the lateral view in FIG. 5.
Figure 7:
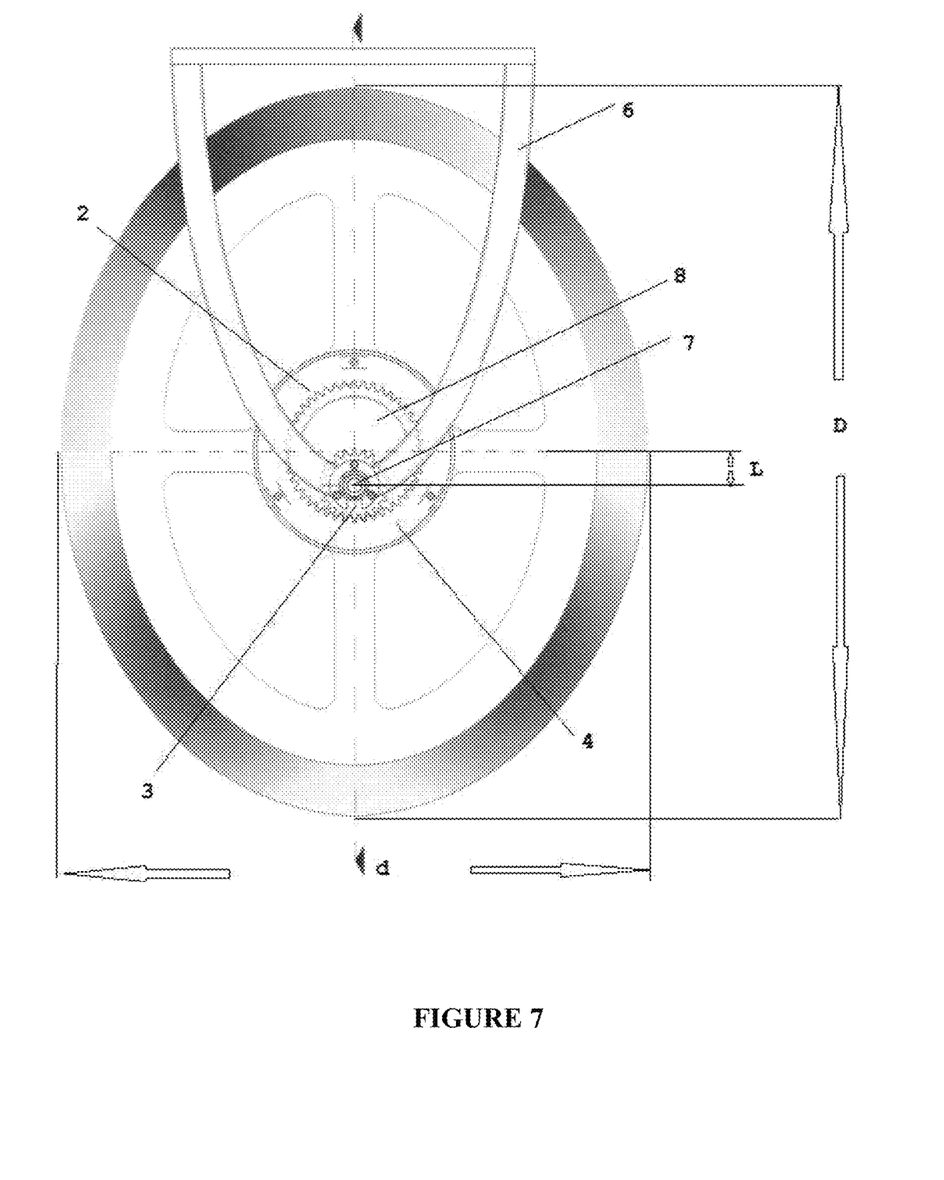
FIG. 7 is a schematic representation of another embodiment of the present invention in which one can observe the elliptical shaped wheel of the present invention using an eccentric.

Crankshaft (1) with one or two support points (13, 13a) or one eccentric (8) with support points (13, 13a), which length of the crankshaft arm (L) or the distance between the two centers of the diameters of the eccentric (8) shaft, must be equal to ¼ of the difference between the largest "D" and smallest "d" diameter of the ellipse, that is, equal to "R", thereby allowing to compensate the height variation of the axis of the structure to the ground caused by the rotation of the elliptical wheel. This element is shown in FIG. 1 in the case of the embodiment of the invention, using a crankshaft (1) supported only on one side of the structure (6). FIG. 4 represents the embodiment of the invention using a crankshaft (1) with two support points (13, 13a) in the structure (6, 6a) and an alternative embodiment of the present invention is shown in FIG. 7, in which an eccentric (8) is used. In the case of the use of the eccentric (8), there is the need to use a shaft (7) which is used as the eccentric (8) shaft and is supported by the structure (6, 6a).

Crown gear (2) fixed to the elliptical shaped wheel with internal teeth (12), which may be a conventional sprocket, a chain or any other rotary motion transmission mechanism. The diameter of the crown gear (2) should be the difference between the largest "D" and smallest "d" diameter of the elliptical shaped wheel, that is ("D"-"d"). Said crown gear (2) has a circular shape, is fixed to the elliptical shaped wheel drum (4) and is responsible for transmitting said elliptical shaped wheel rotation.

Reel (3), which may be a conventional reel, a transmission reel used in chain transmissions, or any other rotary motion transmission mechanism, in accordance with that used in the crown gear (2). This reel (3) is fixed to the structure (6), and is responsible for rotating the crown gear (2) around it, by transmitting the movement of the crankshaft (1) or eccentric (8). The diameter of the reel (3) is equal to half the difference between the largest "D" and smallest "d" diameters of the elliptical shaped wheel.

Circular drum (4), whose axis coincides with the axis of the elliptical shaped wheel and co-rotational with the elliptical shaped wheel and the crown gear (2).

Figure 8:
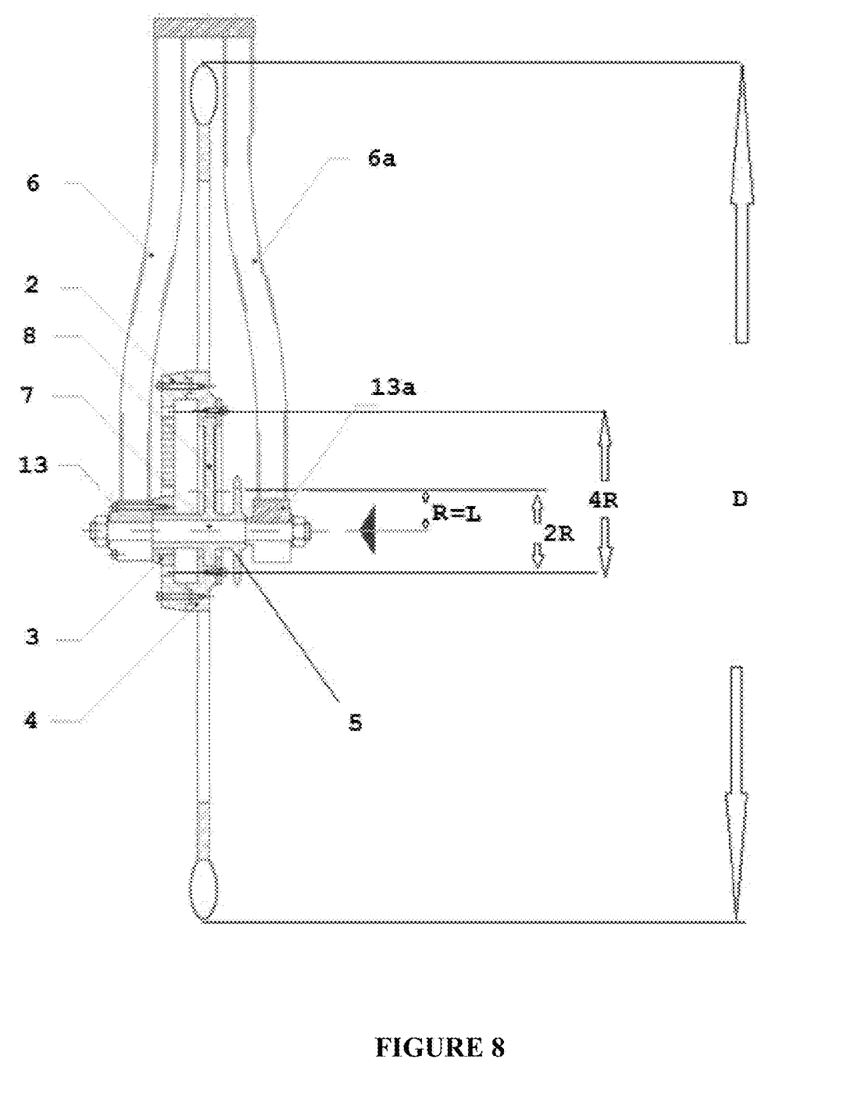
FIG. 8 is a schematic cross section representation of an embodiment of the present invention (eccentric) by the section represented in FIG. 7.
Figure 9:
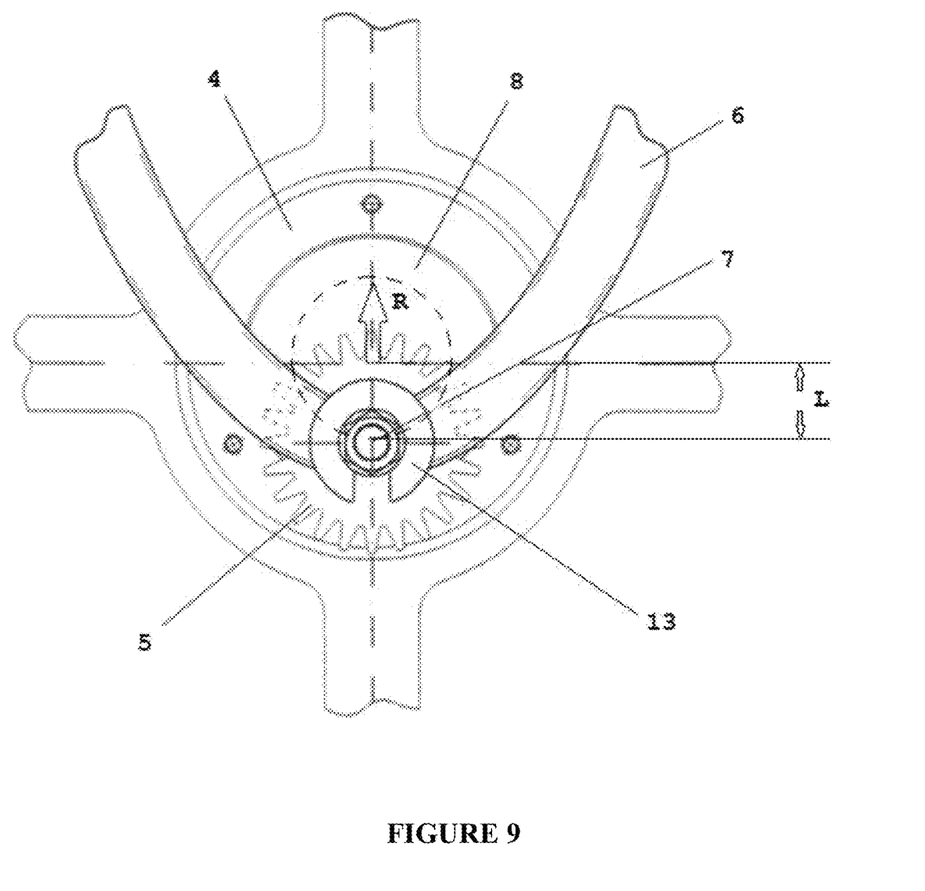
FIG. 9 is a schematic cross section representation of an embodiment of the present invention (eccentric) by a detail of the lateral view in FIG. 8.

In the eccentric version, FIG. 8, it is also used as a bearing to the eccentric.

Reel (5) coupled to the eccentric (8) or crankshaft (1) which transmits the energy source motion (traction induced by a person or other power source) to the elliptical shaped wheel.

The presented schemes, as well as the entirely of the invention are intended to have only an illustrative purpose, and any modification obvious to one skilled in the art is considered to fall in the scope of the present invention.

The invention claimed is:

1. An elliptical shaped wheel with leveled axis, wherein a height of an attached frame relative to a surface upon which the wheel contacts does not vary during each rotation cycle, the wheel comprising:
   a) a circle of a radius "R" from a center of the elliptical shaped wheel, wherein the radius "R" of the circle follows the ratio;

$$"R" = \frac{"D" - "d"}{4}$$

wherein D=a major diameter of the elliptical shaped wheel and d=a minor diameter of the elliptical shaped wheel;
   b) a crankshaft or an eccentric shaft, wherein a length of a crankshaft arm or a distance between two centers of the diameters of the eccentric shaft, are equal to ¼ of a difference between the major diameter and the minor diameter of the ellipse;
   c) a crown gear fixed to the elliptical shaped wheel, the crown gear comprising internal teeth and a diameter equal to a difference between the major "D" and minor "d" diameters of the elliptical shaped wheel, wherein the diameter of the crown gear comprises four times "R";
   d) a first reel fixed to the frame, the first reel having a diameter equal to half of the difference between the major and the minor diameters of the elliptical shaped wheel, wherein the first reel transmitting movement of the crankshaft or the eccentric shaft and permitting rotation of the crown gear around the first reel;
   e) a circular drum having an axis coinciding with the axis of the elliptical shaped wheel, wherein the circular drum is co-rotational with both the elliptical shaped wheel and the crown gear; and
   f) a second reel coupled to the eccentric shaft or the crankshaft.

2. The elliptical shaped wheel with leveled axis according to claim 1, wherein the crankshaft comprises one or two support points.

3. The elliptical shaped wheel with leveled axis according to claim 1, wherein the eccentric shaft comprises the axis of the wheel.

4. The elliptical shaped wheel with leveled axis according to claim 1, wherein the crown gear has a circular shape and is fixed to an elliptical shaped wheel drum.

5. The elliptical shaped wheel with leveled axis according to claim 4, wherein the crown gear is selected from the group consisting of: a conventional sprocket, a chain and a rotary motion transmission mechanism.

6. The elliptical shaped wheel with leveled axis according to claim 1, wherein the crown gear is selected from the group consisting of: a conventional sprocket, a chain and a rotary motion transmission mechanism.

7. The elliptical shaped wheel with leveled axis according to claim 1, wherein the first reel is selected from the group consisting of: a conventional reel, a transmission reel for chain transmissions, and a rotary motion transmission mechanism, in accordance with the crown gear.

8. The elliptical shaped wheel with leveled axis according to claim 1, wherein the circular drum having an axis coinciding with the axis of the elliptical shaped wheel, and the circular drum is co-rotational with both the elliptical shaped wheel and with the crown gear.

\* \* \* \* \*